US008068818B2

(12) United States Patent
Westman

(10) Patent No.: US 8,068,818 B2
(45) Date of Patent: Nov. 29, 2011

(54) ROUTING OF MEDIA COMMUNICATION SERVICE

(75) Inventor: Ilkka Westman, Helsinki (FI)

(73) Assignee: Nokia Corporation, Espoo (FI)

( * ) Notice: Subject to any disclaimer, the term of this patent is extended or adjusted under 35 U.S.C. 154(b) by 179 days.

(21) Appl. No.: 10/960,640

(22) Filed: Oct. 8, 2004

(65) Prior Publication Data

US 2006/0035637 A1 Feb. 16, 2006

(30) Foreign Application Priority Data

Aug. 16, 2004 (FI) ..................................... 20045298

(51) Int. Cl.
*H04M 1/00* (2006.01)
(52) U.S. Cl. ..................... 455/414.1; 455/403; 455/517; 455/566; 370/389; 370/467
(58) Field of Classification Search .................. 455/445, 455/461, 415, 466, 403, 517, 566, 414.1; 370/389, 467
See application file for complete search history.

(56) References Cited

U.S. PATENT DOCUMENTS

| 7,573,873 | B1 * | 8/2009 | Borella et al. ................. 370/389 |
| 2002/0086689 | A1 * | 7/2002 | Moran et al. ................... 455/466 |
| 2003/0069936 | A1 * | 4/2003 | Warner et al. ................. 709/206 |
| 2004/0029597 | A1 * | 2/2004 | Holt et al. ...................... 455/461 |
| 2004/0148416 | A1 | 7/2004 | Aamos et al. |
| 2009/0227236 | A1 * | 9/2009 | Sanchez Herrero et al. .......................... 455/414.1 |

FOREIGN PATENT DOCUMENTS

| WO | WO 2004/008786 A1 | 1/2004 |
| WO | WO 2005/004435 A1 | 1/2005 |

OTHER PUBLICATIONS

3GPP TS 23.228 V6.6.0, "3$^{rd}$ Generation Partnership Project; Technical Specification Group Services and System Aspects; IP Multimedia Subsystem (IMS); Stage 2 (Release 6)", Jun. 2004, pp. 63-68.

* cited by examiner

*Primary Examiner* — Charles Appiah
*Assistant Examiner* — Randy Peaches
(74) *Attorney, Agent, or Firm* — Mintz, Levin, Cohn, Ferris, Glovsky and Popeo, P.C.

(57) ABSTRACT

A method of routing a request in a communication system. The method comprises searching routing information associated to an identity, and prioritizing either one of the routing information related to the identity for the first type and the routing information related to the identity of the second type. The request is then routed by using the prioritized routing information. The invention advances correct routing in a system where different identity types are available.

20 Claims, 2 Drawing Sheets

ROUTING OF MEDIA COMMUNICATION SERVICE

FIELD OF THE INVENTION

The present invention relates to telecommunication and more particularly to routing of communication messages in multimedia communication.

BACKGROUND OF THE INVENTION

As the telecommunication systems have evolved, services utilizing multimedia transmission have gained more and more ground. IP multimedia core network subsystem of the 3$^{rd}$ Generation Partnership Project (3GPP) has been designed to enable operators a standardized way to offer their subscribers multimedia services based on and built upon Internet applications, services and protocols. Smooth integration of existing services and stand-alone network elements for the standardized IP multimedia core network subsystem thus seems to present an inevitable task for most operators.

For example, Push-to-talk over Cellular (PoC) service can be provided as a packet-based user or application level service in a digital communication system. In PoC, the underlying communications system provides the basic connections (i.e. IP connections) between the communications applications in the user terminals and the communication service. The PoC communication service can be provided by a communication server system while the client applications reside in the user equipment or user terminals.

Owing to the significant interest for the PoC services, individual vendors have already provided early adaptations of the technology, primarily in form of stand-alone PoC systems. Quite recently a group of interested organizations have prepared an industry specification for PoC, with the aim to follow existing 3$^{rd}$ Generation Partnership Project (3GPP) IP Multimedia Subsystem (IMS) specifications. The standardization work in this direction has since then continued in Open Mobile Alliance (OMA) using this industry specification as a starting point.

However, integration of the stand-alone PoC systems to IMS systems has presented some unexpected problems. When a PoC operator wishes to integrate his stand-alone PoC system in the IMS, it would seem obvious to create an IMS subscription for all identities and subscribers of the existing PoC system, but this is, however, not the case. For example, all existing PoC users would then be obliged to upgrade their current PoC terminals into IMS capable PoC terminals and to configure the new terminals. At the time of integration the installed base of the existing system is likely to be considerable, and such extensive operations could meet a lot of resistance and cause a considerable amount of administrative work.

Furthermore, it is not likely that all PoC subscribers immediately wish to become IMS subscribers. Some subscribers may be ready for direct IMS migration, but some subscribers may also wish to time the migration to a later date and to control the timing themselves. Users who do not wish to become IMS subscribers are not willing to be charged for any IMS traffic, either. However, the implementation of two kinds of IMS traffic, chargeable and non-chargeable, is not easily managed.

Conventionally subscribers are categorized according to type by arranging the users' identity information into appropriate ranges. This may be implemented, for example, by configuring identities of the system so that the type of each user is easily deducible from the identity information, or by mapping the identities according to type to some other pre-categorized identity information. However, when the status of the categorizing type is not static but changes dynamically, these conventional means easily lead to complicated and conflicting definitions and implementations.

For example, users of the existing PoC system that do not migrate at integration may be initially arranged to a specific addressable identity range. When they begin to show an interest in IMS services and wish to become IMS subscribers, they somehow need to be excluded from the address range. In order to manage this, the identity ranges would need to be divided which would make the management of the subscriber information very complicated. Such complexity would also affect to the critical activities based on identity information, especially the routing where the next hop is typically defined based on the identity information in the transmitted message.

BRIEF DESCRIPTION OF THE INVENTION

An object of the present invention is to provide a solution to prevent or eliminate problems of routing in communication systems that allow using at least two types of identities, typically including an individual identity and a ranged identity, and where the identity itself does not indicate its type. When such an identity is used for routing, interpretation of the type of identity may not be appropriate for the current purpose, and routing may actually fail or succeed depending on the ongoing activity. The objects of the invention are achieved by a method and a network element, which are characterized by what is stated in the independent claims. The preferred embodiments of the invention are disclosed in the dependent claims.

The invention is based on the idea of allowing the co-existence of different types of identities and ensuring the consistency when using the identities by controllably prioritizing the routing information related to one of the identity types over the routing information related to the other identity types. The identities are advantageously publicly available for users of the communication system for requesting actions related to an entity associated with the identity.

An advantage of the method and arrangement of the invention is that it improves the correct routing in a system where different identity types are available.

BRIEF DESCRIPTION OF THE DRAWINGS

In the following the invention will be described in greater detail by means of preferred embodiments with reference to the attached drawings, in which.

DETAILED DESCRIPTION OF THE INVENTION

The invention is applicable to be used in any communication system capable of providing media communication service that can be integrated to a client server environment, for example a 3GPP IP Multimedia Subsystem, a 3GPP2 Multimedia Domain (MMD) or a SIP service environment. Such systems comprise mobile communication systems as well as fixed telecommunication systems. In the following the present invention is described by means of a Push-to-talk over Cellular (PoC) media communication service in a third generation mobile communication system, without limiting the invention to this specific service or the terms used in description of the embodiment. The term service herein refers to intangible products consisting of activities between the service provider and the customer to meet the needs of the customer, covering both basic services as well as any supplementary services modifying or supplementing the underlying basic services.

Figure 1:
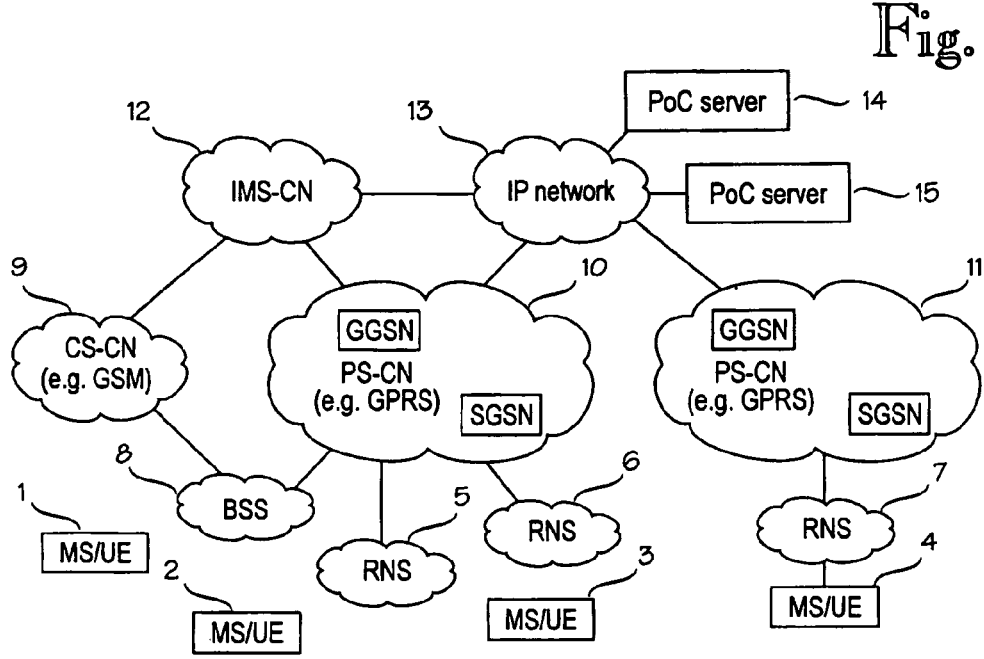
FIG. 1 is a block diagram illustrating the embodied communication system of the present invention.

As illustrated in FIG. 1, in the third generation (3G) mobile communications systems, a public land mobile network (PLMN) infrastructure may be logically divided into a core network (CN) 9, 10, 11, 12 and access network (AN) infrastructures 5, 6, 7, 8. The access network AN may be called a base station subsystem (BSS) 8 for the GSM and radio network subsystem (RNS) or radio access network (RAN) 5, 6, 7 for the UMTS. In the technical specifications of a third generation partnership project (3GPP), the core network CN is logically divided into a circuit-switched (CS) domain 9, a packet-switched (PS) domain 10, 11 and an IP multimedia subsystem (IMS) 12. The CS domain refers to a set of all the CN entities offering "CS type of connection" for user traffic as well as all the entities supporting the related signalling. A "CS type of connection" is a connection for which dedicated network resources are allocated when a connection is established and released when the connection is released. A "PS type of connection" transfers the user information using packets so that each packet can be routed independently from the previous one. An example of the PS domain may be the GPRS (General Packet Radio Service), and the typical entities may include a serving GPRS support node (SGSN) and a gateway GPRS support node (GGSN). The IP multimedia subsystem comprises CN elements for provision of multimedia services. The IP multimedia subsystem IMS utilizes the PS domain to transport multimedia signalling and bearer traffic.

The Push-to-talk over Cellular (PoC) is an overlay speech service in a mobile cellular network. In PoC a connection between two or more parties is established typically for a long period but the actual radio channels in the air interface are activated only when somebody is talking. This corresponds to the usage of the conventional radiotelephones where the radio frequency used is agreed upon between the parties (e.g. military/police radios, LA radios) or permanently set (walkie-talkie type of radios) and whenever somebody wishes to talk she/he presses the tangent, which activates the radio transmission on the selected channel. The traditional radiotelephone services are simplex by nature, meaning that only one party (the one who is pressing the tangent) can talk at a time.

More specifically, in voice communication with "push-to-talk, release-to-listen" feature, a call is based on the use of a pressel (push-to-talk switch) as a switch in a telephone: by pressing a pressel the user indicates his desire to speak, and the user equipment sends a service request to the network. Alternatively, a voice activity detector (VAD) or any suitable means can be used instead of the manual switch. The network either rejects the request or allocates the requested resources on the basis of predetermined criteria, such as the availability of resources, the priority of the requesting user, etc. At the same time, a connection is also established to a receiving user, or users when group communication is concerned. After the voice connection has been established, the requesting user may talk and the other users may listen. When the user releases the pressel or traffic inactivity occurs, such an event is detected in the network, and the resources may be released and/or the talk item may be granted to another user.

In FIG. 1, as an example, a Push-to-talk Over Cellular (PoC) server system is illustrated as provided on top of the Packet Switched (PS) core network 10, 11, 12 in order to provide packet mode (e.g. IP) communication services to the User Equipment (UE) 1, 2, 3, 4. A UE accessing the PS CN, and the PS core network itself, utilizes the services provided by the Radio network subsystem (RNS) or Radio access network (RAN) 5, 6, 7, 8 to provide packet-mode communication between the UE and the PS CN subsystem. The multiple access method employed in the air interface in the RAN may be Time Division Multiple Access (TDMA), Frequency Division Multiple Access (FDMA), Code Division Multiple Access (CDMA), or any other method or a combination thereof. In the $3^{rd}$ and higher generation mobile communications system the access method is primarily based on the CDMA. Further, because the traffic channels may have a wide bandwidth, corresponding to user data rates e.g. up to 2 Mbits/s, such access may also be referred as a Wideband CDMA (WCDMA).

Conceptually, a packet based media communication system is provided on top of the mobile network in order to provide media communication services to the user equipment UE through the communication system. The media communication system may be embodied as a server system, and it is generally referred to as a media communication server. A communication system may comprise a plurality of media communication servers 14, 15.

In this embodiment the media communication servers are referred to as PoC servers, and they illustrate the combination of PoC functions that are necessary to provide the PoC service. PoC functions may be implemented in one or more separate PoC server(s) or as integrated into one or more network entities. A PoC Server is a media communication server that may be an endpoint of SIP signaling, as well as real time transport protocol (such as Real-time Transport Protocol (RTP)), and real time transport control protocol (such as Real-time Transport Control Protocol (RTCP)) signaling. The PoC Server may provide SIP session handling, policy control for access to groups, group session handling, access control, do-not-disturb (i.e. incoming session barring) functionality, floor control functionality, talker identification, participants information, quality feedback, charging reports and media distribution. A general PoC system architecture also specifies a Group and List Management Server (GLMS) which may be used in the PoC to manage groups, contact lists and access lists of the PoC users. For a person skilled in the art it is clear that the term PoC server may be interpreted to refer to a single PoC server or to a PoC system comprising a combination of a PoC server and other entities of the PoC system architecture.

Figure 2:
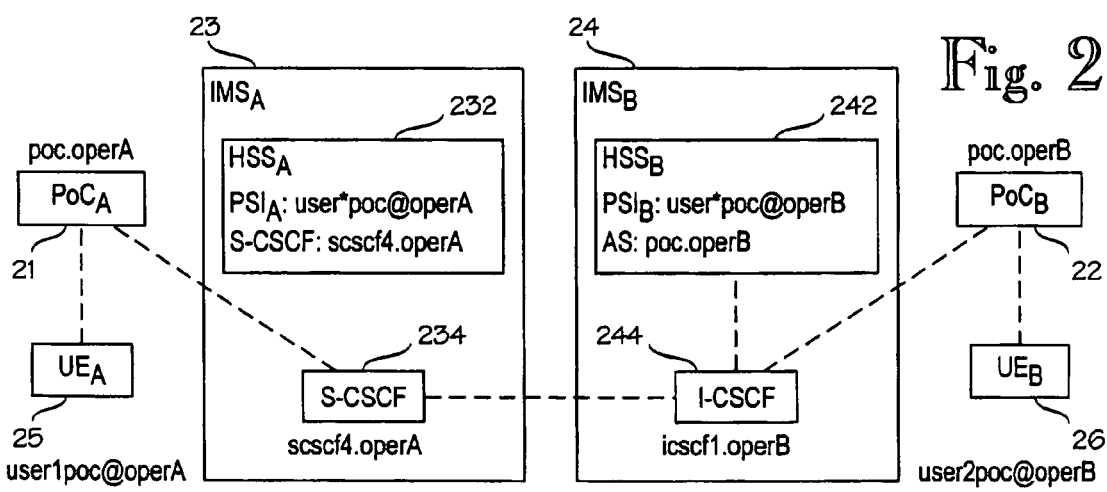
FIG. 2 is a block diagram illustrating an exemplary embodiment of two interconnected PoC servers.

The block diagram of FIG. 2 shows the network elements related to the currently described embodiment of the present invention. More specifically, FIG. 2 shows an embodiment where two former stand-alone PoC servers $PoC_A$ 21 and $PoC_B$ 22 have been interconnected through IM subsystems $IMS_A$ 23 and $IMS_B$ 24, in order to allow the PoC communication between user equipment $UE_A$ 25 and $UE_B$ 26 to take place. PoC servers that are not integrated with the IMS are in this context referred to as stand-alone PoC servers. For clarity, it should be noted that only essential elements for illustrating this particular embodiment of the present invention are shown in this description. For a person skilled in the art it is clear that complete communication systems comprise a plurality of elements that are not explicitly shown herein. Furthermore, in FIG. 2 both PoC servers are integrated into separate IMS systems, but it is equally possible to implement the invention in configurations where the IMS is used in the originating or in the terminating end only, or where one IMS system interconnects two separate PoC servers (i.e. $IMS_A$ 23 and $IMS_B$ are the same).

The IP Multimedia Core Network subsystem (IM CN subsystem), also called as IP Multimedia subsystem (IMS), comprises all core network elements for provision of multimedia services. The session flow procedures of an IMS session are controlled by a call session control function (CSCF), which is divided into several different roles. A Proxy-CSCF (P-CSCF) is substantially the first contact point within the IMS. The P-CSCF behaves like a proxy and thus accepts requests and services them internally or forwards them. An interrogating-CSCF (I-CSCF) is the contact point within an operator's network for all connections destined to a user of that network operator. A Serving-CSCF (S-CSCF) performs the session control services for the user equipment. It maintains a session state as required by the network operator for supporting the services. The S-CSCF usually contains a subscriber database to which required subscription data is downloaded when the user terminal registers to the S-CSCF. The operation of these call session control functions in this embodiment will be discussed below in more detail.

The present embodiment illustrates a case where routing information related to the public user identity is prioritized. In the following, the embodiment is illustrated with a routing scenario where a user equipment $UE_A$ 25 sends a request addressed to a PoC identity associated with the user equipment $UE_B$ 26. The IMS session is formed by flows of mobile originating information, information between the serving call session control functions, and mobile terminating information. The block diagram of FIG. 2 describes the elements for implementing the information flows in the embodiment of the present invention. In the originating side, $UE_A$ 25 first sends a request to a PoC server $PoC_A$ 21 of his home network. According to the embodiment of the invention, PoC subscribers are not directly IMS subscribers, but initially continue operating with their PoC user identity. On the other hand, routing between the PoC servers is managed based on IMS Public Service Identities.

An IP Multi-Media Subsystem is an example of a system that comprises a variety of identities that may be associated with IP multimedia services. Firstly, every IP Multi-Media Subsystem may have one or more private user identities. The private identity is assigned by the home network operator and may be used, for example, for registration, authorisation, administration, and accounting purposes. The IP Multi-Media Subsystem may also have one or more public user identities. The public user identity/identities may be used by any use, as the IMS is capable of routing IMS messages using a public service identity (PSI). The PSI differs from the public user identity in that it identifies a service that is hosted by an application server. Each PSI is hosted by an application server that executes the service specific logic identified by the PSI.

An application server hosting the PSI may be invoked as an originating application server by modifying the filter information within the subscriber information of the users that intend to use the service identified by the PSI. The SIP requests are directed to the corresponding application server according to the originating filtering rules in the S-CSCF of the user who is using the service. Such statically pre-configured PSIs are available internally within the IMS of the operator's domain.

In FIG. 2 this is illustrated by means of routing information stored in Home Subscriber Servers $HSS_A$ 232 and $HSS_B$ 242 of the $IMS_A$ 23 and $IMS_B$ 24. Generally, a Home Subscriber Server is a master database, which is used for keeping a list of features and services associated with a user, and for tracking the location and means of access for its users. The HSS provides the functions of a conventional home location register, but differs from the conventional home location register in that it also communicates via IP-based interfaces and provides the functions of the user mobility server. As shown, $HSS_A$ 232 comprises routing information associated with public user identities, as well as public service identities of $IMS_A$ 23. For example, a wildcarded public service identity range PSI1A (user*poc@operA) has a routing address poc.operA because the range is hosted in the PoC server $PoC_A$. In addition e.g. the address of the S-CSCF 234 (scscf4.operA) may be assigned to the wildcarded public service identity range $PSI1_A$ to be used in originating routing from the integrated PoC server $PoC_A$ to $IMS_A$ 23. Correspondingly $HSS_B$ 242 comprises routing information associated with public user identities and public service identities of $IMS_B$ 24. For example the wildcarded public service identity range $PSI1_B$ (user*poc@operB) has the routing address poc.operB because the range is hosted in the PoC server $PoC_B$.

The request from the user equipment $UE_A$ 25 is delivered to the $PoC_A$ 21, whose address in this example is poc.operA. In the integrated environment the $PoC_A$ 21 acts as an application server (AS) and routes the request according to the originating PSI routing. Routing from the originating AS hosting the PSI can be performed in two ways.

a) The AS may forward the originating request to the destination network without involving a S-CSCF.

b) In case the PSI has a S-CSCF assigned, the AS may forward the originating request to this S-CSCF, which then processes the request as per regular originating S-CSCF procedures.

In FIG. 2 option b) is illustrated. The address of the S-CSCF may be configured in the $PoC_A$ 21 or it may be retrieved from the home subscriber server $HSS_A$ 232 of the IM subsystems $IMS_A$ 23, or some other database storage, table, list, file or the like available to the $PoC_A$ 21. In this example the scscf4.operA i.e. the S-CSCF 234 is assigned in the $HSS_A$ 232 to the public service identity $PSI1_A$.

The Serving-CSCF 234 handling the session origination performs an analysis of the destination address, and determines that it belongs to a subscriber of a different operator. The request is therefore forwarded to an entry point in the destination operator's network, the I-CSCF 244.

Generally in the IMS, an application server hosting the PSI may also be invoked as a terminating application server with the PSI. The related PSIs are configured in the home network, are globally routable and can be made available to users within and outside the operator domain.

A PSI can take the form of a distinct PSI (e.g. my_service@example.com), or of a wildcarded PSI (e.g. chat-list_44@example.com belonging to the wildcarded PSI range chat-list_*@example.com). A range of PSIs with the same domain part in the SIP URI may be defined using a wildcard indication in the user part of the SIP-URI. There are at least two ways to route towards the AS hosting the PSI:

a) The HSS maintains the assigned S-CSCF information and ISC Filter Criteria to route to the AS hosting the PSI according to IMS routing principles. In this case, the I-CSCF receives SIP requests at the terminating side, queries the HSS and directs the request to the S-CSCF assigned to the PSI. The S-CSCF forwards the session to the application server hosting the PSI according to the terminating ISC Filter Criteria.

b) The HSS maintains the address information of the AS hosting the PSI. In this case, the AS address information for the PSI is returned to the I-CSCF in the location query response or the like, in which case the I-CSCF will forward the request directly to the AS hosting the PSI.

In the embodiment of FIG. 2 option b) is illustrated. The I-CSCF 244 of operator B sends a query to the home subscriber server $HSS_B$ 242 of the IM subsystem $IMS_B$ 24 to ask for a forwarding address for the request addressed to a PoC user identity user2poc@operB associated with the $UE_B$ 26. The $HSS_B$ 242 returns the AS address poc.operB assigned to the matching wildcarded public service identity range $PSI1_B$ (user*poc@operB), and the I-CSCF 244 using the returned AS address (poc.operB) routes the request to the PoC server $PoC_B$ 22 that then delivers the request to the user equipment $UE_B$.

Figure 3:
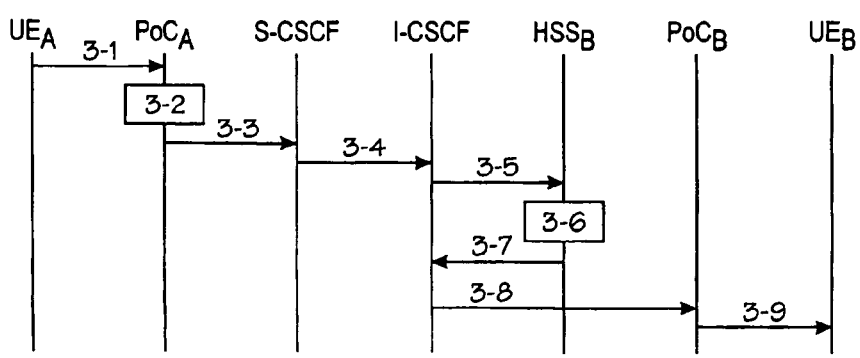
FIG. 3 illustrates a signalling flow related to the embodiment described in FIG. 2.

FIG. 3 illustrates the signaling flow information transfer related to the elements and data transfer described in the example of FIG. 2. In step 3-1 the PoC user user1poc@operA sends a request to his home PoC server poc.operA. In step 3-2 the PoC server determines a S-CSCF assigned to itself in the configuration, or assigned to the wildcarded PSI user1poc@operA in the $HSS_A$ 232. In this example a query is made to the $HSS_A$ 232 and a matching wildcarded PSI range is found, i.e. $PSI1_A$ that is user*poc@operA with scscf4.operA assigned as an S-CSCF. In step 3-3, the PoC server sends the request to the assigned S-CSCF scscf4.operA, which forwards the request to the entry point (e.g. I-CSCF) of the IMS network where the PoC server of the user user2poc@operB is located (step 3-4). In step 3-5, the I-CSCF makes a query to the home subscriber server of the receiving user, which server maps the identity user2poc@operB to a public service identity range user*poc@operB and retrieves the name/address information (poc.operB) of the AS that hosts the wildcarded public service identity range user*poc@operB (step 3-6). The home subscriber server of the receiving user returns the address poc.operB of the home PoC server of user2poc@operB (step 3-7), and the I-CSCF routes the message to poc.operB (step 3-8). In step 3-9, the PoC server of the operator B sends the request to user2poc@operB.

In the described embodiment, in the terminating routing from the PoC server to the user terminal and in the originating routing from the user terminal to the PoC server, identities of the integrated system identities or of the stand-alone PoC system can be applied. In the originating and terminating routing between the PoC servers, the IMS public service identity routing is applied. This means that routing in the integrated system can be managed without obliging the users to directly become IMS subscribers, which provides several advantages. From the terminal's point of view the existing PoC system looks the same and the users of the existing PoC system may continue to use their PoC terminals and no immediate need for changing or reconfiguring of PoC terminals is associated with the integration. Still, the routing in the network to network interface of the integrated system is harmonized according to the principles of the IMS. From the operator's point of view the arrangement allows utilization of the existing PoC server in the integrated environment and the installed base does not become obsolete when integrated. Furthermore, the operator may add new users to the integrated PoC server as the IMS users and avoid immediate investment to a new PoC server.

However, a further problem is still related to the situation where former stand-alone subscribers wish to become subscribers of the IMS. In the solution described above the identities of the PoC users were grouped into one or more PSI ranges. In order to exclude a subscriber identity of a migrating subscriber from the PSI range the operator would need to divide the PSI range into separate parts. Repeating this for a number of subscribers would very quickly lead to the fragmentation of the PSI range into a plurality of PSI ranges.

In a solution according to the present invention the PoC users may, however, primarily maintain their PoC subscription, be subscribed to the IMS at any moment and still avoid the division of the PSI range. This is managed by allowing the parallel existence of a wildcarded public service identity range and a public user identity belonging to that range, and consistently using the public user identity as a first search criteria. For example, a PoC user mailto:may become a subscriber of the IMS using his PoC identity user7poc@operB as an IMS public user identity with normal public user identity routing, while the routing of the other PoC identities in the wildcarded PSI range user*poc@operB still refers to the originating/terminating PSI routing from/to the PoC server. The routing information associated with the public user identity user7poc@operB should be given precedence over the routing information associated with the public service identity user7poc@operB as a member of the wildcarded PSI range user*poc@operB. This is illustrated in FIGS. 4 and 5 by means of elements and related information flows in an embodiment of the present invention.

Figure 4:
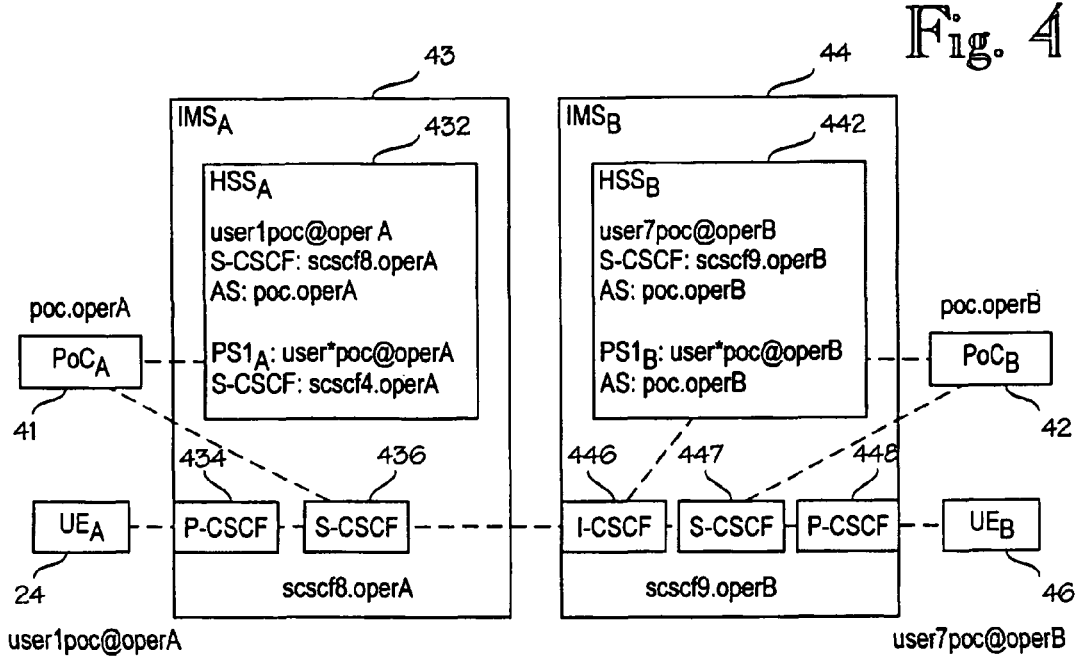
FIG. 4 is a block diagram illustrating a further embodiment of two interconnected PoC servers.
Figure 5:
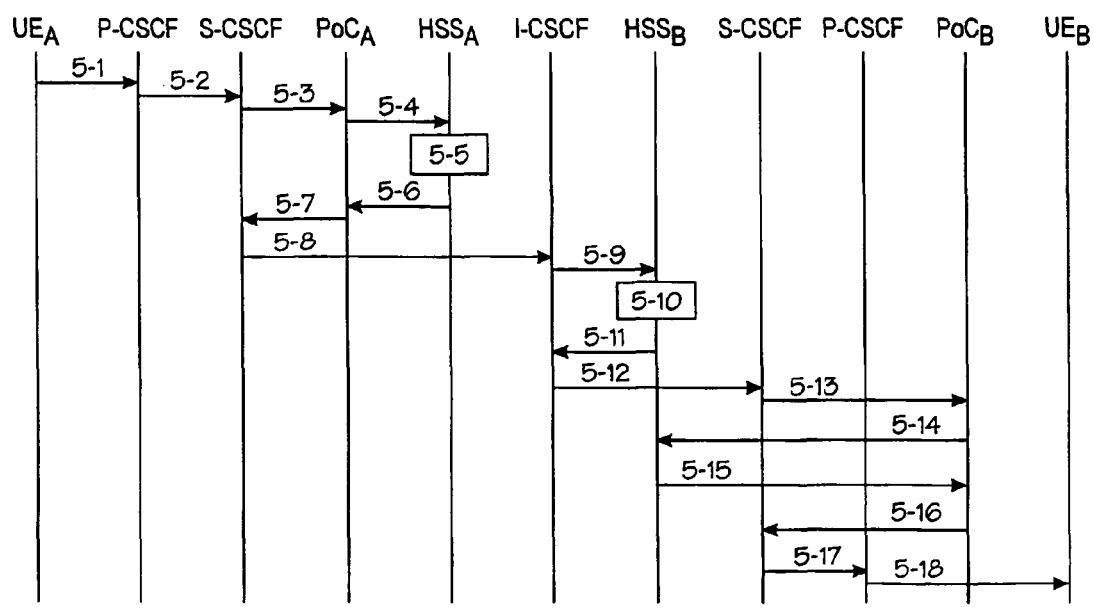
FIG. 5 illustrates a signalling flow related to the embodiment described in FIG. 4.

The block diagram of FIG. 4 shows the elements for implementing the currently described embodiment in a procedure for transmitting a request from a PoC user equipment $UE_A$ to a PoC user equipment $UE_B$. Corresponding to FIG. 2, FIG. 4 shows two former stand-alone PoC servers $PoC_A$ 41 and $PoC_B$ 42 interconnected though IM subsystems $IMS_A$ 43 and $IMS_B$ 44, in order to allow PoC communication between user equipment $UE_A$ 45 and $UE_B$ 46. In FIG. 4 both PoC servers are again integrated into separate IMS systems, and furthermore, some of the PoC users have also become IMS subscribers. As shown in FIG. 4, the Home Subscriber Server $HSS_A$ 432 of operator A comprises routing information of the public user identity (user1poc@operA) associated with the user equipment $UE_A$ 45 and routing information of the wildcarded public service identity range (user*poc@operA) containing the public user identity as a member of the range. More specifically, the $HSS_A$ 432 comprises the address of the S-CSCF (scscf8.operA) 436 associated with the public user identity (user1poc@operA) registered by the user equipment $UE_A$, and application server (AS) address (poc.operA) in the filter criteria associated with this public user identity. Additionally, the $HSS_A$ 432 comprises the address of another S-CSCF of the $IMS_A$ 43 assigned to the Public service identity range $PSI1_A$ user*poc@operA. Correspondingly the $HSS_B$ 442 comprises the address of the S-CSCF (scscf9.operB) 447 associated with the public user identity (user7poc@operB) registered by the user equipment $UE_B$ 46, and application server (AS) address (poc.operB) in the filter criteria associated to this public user identity. Additionally, the $HSS_B$ 442 comprises the AS address (poc.operB) to the PoC server 42 of $IMS_B$, assigned to the Public service identity range $PSI1_B$ user*poc@operB.

In the embodiment of FIG. 4, a user $UE_A$ 45 sends a request that is routed to the P-CSCF 434, the first contact point within the IM CN subsystem. The P-CSCF 434 remembers from the registration procedure the CSCF for this Public user identity and routes the request to the S-CSCF 436. Based on the filter criteria downloaded from the $HSS_A$ 432, the S-CSCF 436 routes the message to a PoC$_A$ 41. Routing information for forwarding the request is available to the PoC$_A$ 41 in some form of a database, storage, file, table or the like. FIG. 4 shows the alternative of retrieving the routing information from the HSS$_A$ 432. According to the invention, routing information may first be searched from the HSS$_A$ 432 based on the public user identity associated to the user equipment UE$_A$ 45. Therefore, in response to the query, the HSS$_A$ 432 returns the address of the S-CSCF 436, and the PoC$_A$ 41 routes the request to the S-CSCF 436.

The S-CSCF 436 identifies that the request is addressed to an IMS of network B, and routes the request to an I-CSCF 446 of operator B's service area. In order to be able to route the information, the I-CSCF 446 makes a query to the HSS$_B$ of network B. According to the invention, routing information is now defined to be searched from the HSS$_B$ 442 first based on the public user identity of the receiving user equipment UE$_B$ 46. The definition may be made separately for one or more services, i.e. to be valid for the defined type of requests only. The definition may also be general, for example operator-related definition that is valid in the whole network.

In response to the query, the HSS$_B$ 442 returns the address of a S-CSCF 447 (scscf9.operB) assigned to the public user identity registered by the user equipment UE$_B$ 46. Note that in case the user of the UE$_B$ would not be an IMS subscriber, and a public user identity would not be available, the HSS$_B$ would return the AS address poc.operB assigned to the wildcarded public service identity range PSI1$_B$ user*poc@operB. Now the I-CSCF 446, however, routes the request to the given S-CSCF 447 that evaluates the initial filter criteria of user7poc@operB and finds a match with AS address poc.operB pointing to the PoC server B. At receiving the request, the PoC$_B$ needs routing information to route the request to the receiving user UE$_B$. Again, routing information for forwarding the request is available to the PoC$_B$ in some form of a database, storage, file, table or the like. Routing information may also be retrieved from the received request. FIG. 4 shows an alternative for retrieving the routing information from the HSS$_B$. Based on the public user identity associated with the user equipment UE$_B$, the HSS$_B$ responds to the query by returning the S-CSCF 447 address scscf9.operB assigned to the public user identity. The PoC$_B$ routes the request to the given S-CSCF 447 address. From the registration procedure, the S-CSCF 447 knows the P-CSCF 448 for the UE$_B$, and forwards the request to it. Correspondingly, the P-CSCF 448 knows the UE$_B$ address from the registration procedure, and forwards the request to user UE$_B$.

FIG. 5 illustrates the corresponding signalling flow related to the elements and data transfer described in FIG. 4. In step 5-1 the PoC user UE$_A$ sends to its first contact point, the P-CSCF of IMS, a request comprising its own public user identity user1poc@operA and the public user identity user7poc@operB of user UE$_B$. In step 5-2, the P-CSCF forwards the request to the S-CSCF of UE$_A$, that in step 5-3 forwards, based on the filter criteria of user UE$_A$, the request to the PoC server poc.operA of the user UE$_A$. In step 5-4, the PoC server poc.operA sends a query for the next routing address to the home subscriber server of the IMS of operator A. Alternatively the PoC server of user UE$_A$ may retrieve the S-CSCF address from the received request. According to the embodiment of the invention, routing information is first searched for (step 5-5) according the public user identity user1poc@operA. In step 5-6, the address scscf8.operA of the S-CSCF assigned to the public user identity user1poc@operA is returned to the PoC server of user UE$_A$. The PoC server of user UE$_A$ forwards the message to the assigned S-CSCF (step 5-7), which determines I-CSCF of the operator of the public user identity user7poc@operB. The S-CSCF sends the request to I-CSCF (step 5-8) of operator B. In step 5-9, the I-CSCF of operator B makes a query to the home subscriber server of operator B to obtain the next hop address. According to the embodiment of the invention, the home subscriber server determines (5-10) the routing information based on the public user identity user7poc@operB of the receiving user. The I-CSCF receives (step 5-11) the address scscf9.operB of S-CSCF assigned to the public user identity user7poc@operB of the receiving user and forwards the request (step 5-12) to it. The S-CSCF analyses/evaluates the filtering criteria associated with the public user identity user7poc@operB, and identifies the PoC server of the receiving user and forwards the request (step 5-13) to it. The PoC server of the receiving user queries (steps 5-14 and 5-15) from the home subscriber server of the receiving user the S-CSCF assigned to the public user identity user7poc@operB and delivers (step 5-16) the request to the given S-CSCF address. Alternatively the PoC server of the receiving user may retrieve the S-CSCF address from the received request. The S-CSCF determines P-CSCF of the public user identity user7poc@operB and forwards (step 5-17) the request to it. Finally, the P-CSCF forwards (step 5-18) the request to the user equipment UE$_B$ 46 of the receiving user.

Consequently, the solution according to the invention allows consistent routing for an existing service at the time of integration to the IMS. At the same time it also provides users of the existing service an easy migration to the IMS without having to divide the identity ranges for excluding the migrated users.

In the examples given above the precedence of the routing information of the public user identity was implemented by prioritization of the public user when searching for the routing data, i.e. in the home subscriber server of the sending or the receiving user. The functionality was first performed by for ing the routing information based on the public user identity in the request. If such information was not found, routing information was searched for based on the public service identity. For a person skilled in the art it is clear that this is only one alternative embodiment of the invention. As regards implementation during the search, the prioritization may be implemented as an operational functionality of the database management, as described above, or the information in the database may, for example, be structured in such a manner that the information related to the public user identities are always found first before any public service identities.

Alternatively, the search may be implemented both for the public user identity and for the public service identity and either of the retrieved information may be prioritized after the search. The prioritization may be implemented in the database, whereby primarily the routing information of the public user identity is only provided to the querying function. Alternatively, routing information of both the public user identity and the public service identity may be forwarded to the querying function, who will then prioritize the routing information of the public user identity over the routing information of the public service identity.

In terms of the network elements illustrated in FIGS. 2 and 4, the precedence may be implemented in any querying network entity, like in any of the call session control functions or in an application server (AS), by making sequential or parallel searches based on the separate identity types, and choosing the routing information related to the defined identity type. For example, any call state control function or the application server may submit two searches based on the public user identity and on the public service identity and prioritize the routing information received based on the public user identity. Alternatively, the precedence may be implemented in any queried network entity, like the home subscriber server, or any other database, file, storage, register or like. The queried network entity may make separate sequential or parallel searches with the identity received from the querying network entity, but return only routing information of the prioritized identity type. It is also possible to include in the query a request for routing information based on a special type of identity or based on two or more identity types.

In the described embodiment routing is based on public user identities. It should be noted that the PoC facilitates also group communication, a multi-point communication service. In the IMS, groups are defined to be addressed using public service identities. One of the advantages of the present invention is that integration in the IMS does not cause changes to the addressing of the groups. Requests to and from a PoC group may be routed as a PSI routing or as Public user identity routing, for example depending on the operator's policy. Because group identities are not normally registered, they are not normal Public user identities even if the routing may be similar.

In the above embodiments the public user identity was prioritized over the wildcarded public service identity range when processing the IMS requests. The prioritization order may, within the scope of protection, be defined according to the purpose, separately for one or more service applications or as a network-wide operator definition. There may be, for example, a need to use different types of user identities to collect requests primarily addressed to separate application servers to one general server. As an alternative example, let us consider a case where an operator provides a news service and maintains a general news server as1.example. The operator also maintains separate servers for news concerning sports or politics: as4.example for political news and as7.example for sports news. The operator has defined a wildcarded PSI range news*@example, according to which requests are routed to as1.example, a distinct PSI news-politics@example, according to which requests are routed to as4.example, as well as a distinct PSI news-sports@example, according to which requests are routed to as7.example. If the operator needs to route all news requests to the same general server, the operator may change the prioritization definition so that the identity in any received news request is first searched for as wildcarded PSI identity, instead of a distinct PSI.

Figure 6:
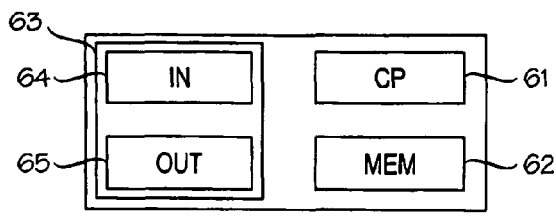
FIG. 6 is a block diagram illustrating a functional description of a server that may be used in PoC system.

The implementation of the described mechanisms in a network element according to the embodiment of the present invention is illustrated by referring to FIG. 6. As an example, FIG. 6 provides a functional description of a network element that may be used in the PoC for a call session control function (CSCF), as a PoC server, or a home subscriber server. By definition a server is a computer that serves other computers in the same or other networks by operating as the other computers request. The server of FIG. 6 comprises processing means 61, an element that comprises an arithmetic logic unit, a number of special registers and control circuits. Connected to the processing means are memory means 62, a data medium where computer-readable data or programs or user data can be stored. The memory means typically comprise memory units that allow both reading and writing (RAM), and a memory whose contents can only be read (ROM). The unit also comprises an interface block 63 with input means 64 for inputting data for internal processing in the unit, and output means 65 for outputting data from the internal processes of the unit. Examples of said input means comprise a plug-in unit acting as a gateway for information delivered to its external connection points. For receiving information on the operator, the server may also comprise a keypad, or a touch screen, a microphone, or the like. Examples of said output means include a plug-in unit feeding information to the lines connected to its external connection points. For outputting information to the operator of the server, they may also comprise a screen, a touch screen, a loudspeaker, or the like. The processing means 61, memory means 62, and interface block 63 are electrically interconnected for performing systematic execution of operations on the received and/or stored data according to the predefined, essentially programmed processes of the unit. In an embodiment according to the invention, such operations comprise a functionality for implementing the operations of the call session control functions (CSCF) or of the PoC server as described above, or database management functions of a home subscriber server as described above.

It will be obvious to a person skilled in the art that, as technology advances, the inventive concept can be implemented in various ways. The described embodiments of the invention may be combined with each other in all possible ways. For example, the receiving user may be an IMS subscriber, while the user originating the session may not be an IMS subscriber, and vice versa.

The PoC service embodied herein represents a variety of media communication services that may be integrated into a variety of packet switched communication systems, herein embodied by the IP Multimedia Subsystem. For example, the S-CSCF, P-CSCF and I-CSCF may be SIP proxies and the PoC server may be a SIP server, and the HSS may be a SIP registrar in SIP networks. Alternatively, S-CSCF, P-CSCF, I-CSCF may be servers in general networks, PoC server may be a server offering a service to users and HSS may be a user database.

Furthermore, use of filter criteria, as described in the embodiment, represent one mechanism to route certain requests to specific application server(s). Any other mechanism or an address in the request may be used for routing. The invention and its embodiments are thus not limited to the examples described above but may vary within the scope of the claims.

The invention claimed is:

1. A method comprising:
    allocating, to a first network, at least one public identity and at least one private identity, the at least one public identity representing a range of identities, the range of identities represented by at least one wildcard character;
    registering, by the first network, in a second network using the at least one private identity;
    receiving, at the second network, a message representing a request, the request comprising an identity of a user; and
    routing, by the second network, the request based on the identity of the user and the at least one public identity.

2. The method of claim 1, wherein the first network is a first internet protocol multimedia subsystem network and the second network is a second internet protocol multimedia subsystem network.

3. The method of claim 1, wherein the at least one public identity is a public service identity that identifies a service hosted by an application server.

4. The method of claim 1, wherein the message is a session initiation protocol message.

5. The method of claim 1, wherein the at least one private identity is a private user identity assigned by an operator.

6. The method of claim 1, wherein at least one of the allocating, the registering, the receiving, and the routing are implemented by at least one processor.

7. The method of claim 1, wherein the routing is performed by at least a call state control function.

8. The method of claim 1, wherein the one public identity is publically available for users requesting actions in a system comprising at least one of the first network and the second network.

9. A computer program embodied in a non-transitory computer readable storage medium, the computer program when executed by a processor provides operations comprising:
   allocating, to a first network, at least one public identity and at least one private identity, the at least one public identity representing a range of identities, the range of identities represented by at least one wildcard character;
   registering, by the first network, in a second network using the at least one private identity;
   receiving, at the second network, a message representing a request, the request comprising an identity of a user; and
   routing, by the second network, the request based on the identity of the user and the at least one public identity.

10. The computer program of claim 9, wherein the first network is a first internet protocol multimedia subsystem network and the second network is a second internet protocol multimedia subsystem network.

11. The computer program of claim 9, wherein the at least one public identity is a public service identity that identifies a service hosted by an application server.

12. The computer program of claim 9, wherein the message is a session initiation protocol message.

13. The computer program of claim 9, wherein the at least one private identity is a private user identity assigned by an operator.

14. The computer program of claim 9, wherein the routing is performed by at least a call state control function.

15. An apparatus comprising:
   at least one processor; and
   at least one memory, wherein the processor and memory are configure to provide operations comprising:
      allocating, to a first network, at least one public identity and at least one private identity, the at least one public identity representing a range of identities, the range of identities represented by at least one wildcard character;
      registering, by the first network, in a second network using the at least one private identity;
      receiving, at the second network, a message representing a request, the request comprising an identity of a user; and
      routing, by the second network, the request based on the identity of the user and the at least one public identity.

16. The apparatus of claim 15, wherein the first network is a first internet protocol multimedia subsystem network and the second network is a second internet protocol multimedia subsystem network.

17. The apparatus of claim 15, wherein the at least one public identity is a public service identity that identifies a service hosted by an application server.

18. The apparatus of claim 15, wherein the message is a session initiation protocol message.

19. The apparatus of claim 15, wherein the at least one private identity is a private user identity assigned by an operator.

20. The computer program of claim 15, wherein the routing is performed by at least a call state control function.

* * * * *